(12) United States Patent
Inuzuka et al.

(10) Patent No.: US 8,850,877 B2
(45) Date of Patent: Oct. 7, 2014

(54) DIAGNOSTIC APPARATUS FOR FUEL-PROPERTY REFORMING SYSTEM

(75) Inventors: Hiroyuki Inuzuka, Obu (JP); Makoto Miwa, Kariya (JP)

(73) Assignee: Denso Corporation, Kariya (JP)

( * ) Notice: Subject to any disclaimer, the term of this patent is extended or adjusted under 35 U.S.C. 154(b) by 113 days.

(21) Appl. No.: 13/489,542

(22) Filed: Jun. 6, 2012

(65) Prior Publication Data

US 2012/0312087 A1 Dec. 13, 2012

(30) Foreign Application Priority Data

Jun. 8, 2011 (JP) .................................. 2011-127939

(51) Int. Cl.
| | | |
|---|---|---|
| *G01M 15/10* | (2006.01) | |
| *F02M 25/07* | (2006.01) | |
| *F01N 11/00* | (2006.01) | |
| *F02D 41/22* | (2006.01) | |

(52) U.S. Cl.
CPC ........ *F02D 41/221* (2013.01); *F02D 2041/224* (2013.01); *F02M 25/0702* (2013.01); *Y02T 10/32* (2013.01); *F01N 2240/30* (2013.01); *F01N 2560/025* (2013.01); *F01N 11/007* (2013.01); *F01N 2550/05* (2013.01); *F02M 25/0742* (2013.01); *F02M 25/074* (2013.01); *G01M 15/104* (2013.01)
USPC ...................................................... 73/114.74

(58) Field of Classification Search
CPC .. F01N 11/007; F01N 2550/05; F02D 41/221
USPC .............. 73/114.38, 114.39, 114.45, 114.69, 73/114.74, 114.75
See application file for complete search history.

(56) References Cited

U.S. PATENT DOCUMENTS

| | | | | |
|---|---|---|---|---|
| 7,849,678 | B2 * | 12/2010 | Chimner et al. ................. | 60/295 |
| 8,015,952 | B2 * | 9/2011 | Pursifull ........................... | 123/3 |
| 8,360,015 | B2 * | 1/2013 | Pursifull ........................... | 123/3 |
| 2011/0132288 | A1 * | 6/2011 | Pursifull ........................... | 123/3 |
| 2012/0055423 | A1 * | 3/2012 | Pursifull ........................... | 123/3 |
| 2012/0285400 | A1 * | 11/2012 | Inuzuka et al. ................... | 123/3 |
| 2012/0291424 | A1 * | 11/2012 | Inuzuka et al. ................. | 60/299 |

FOREIGN PATENT DOCUMENTS

JP 2007-113420 5/2007

* cited by examiner

*Primary Examiner* — Eric S McCall
(74) *Attorney, Agent, or Firm* — Nixon & Vanderhye PC

(57) ABSTRACT

In a reforming driving mode, while the EGR valve is opened to recirculate a part of exhaust gas into the intake pipe, a reforming-fuel injector injects a reforming-fuel into an exhaust gas flowing through an EGR pipe. The injected reforming-fuel is vaporized and flows into the fuel-reforming catalyst. The fuel-reforming catalyst reforms the fuel in the exhaust gas into the fuel having high combustibility. In the reforming driving mode, the computer determines whether an air-fuel ratio within the normal range. Based on this result, the computer determines whether the reforming-fuel injector has a malfunction. When the reforming-fuel injector has a malfunction, a fail-safe processing is conducted to prohibit the reforming-fuel injector from injecting the reforming-fuel.

5 Claims, 11 Drawing Sheets

DIAGNOSTIC APPARATUS FOR FUEL-PROPERTY REFORMING SYSTEM

CROSS-REFERENCE TO RELATED APPLICATION

This application is based on Japanese Patent Application No. 2011-127939 filed on Jun. 8, 2011, the disclosure of which is incorporated herein by reference.

TECHNICAL FIELD

The present disclosure relates to a diagnostic apparatus for a fuel-property reforming system. The fuel-property reforming apparatus reforms a property of fuel supplied to an internal combustion engine. The property of fuel is referred to as fuel property, hereinafter.

BACKGROUND

JP-2007-113420A shows a fuel-property reforming apparatus which is provided with a reforming-fuel injector which injects a reforming-fuel into intake air and a fuel-reformer which has a fuel-reforming catalyst reforming fuel. The fuel-reformer is arranged downstream of the reforming-fuel injector. The reformed fuel is introduced into an intake pipe.

If a malfunction occurs in the fuel-reformer, it is likely that a combustion condition of the engine may be deteriorated. Thus, such a malfunction should be detected as early as possible.

The fuel-property reforming apparatus shown in JP-2007-113420A has a temperature sensor which detects temperature of the fuel-reforming catalyst. If the detected temperature of the fuel-reforming catalyst becomes out of a specified temperature range, the computer determines that the fuel-reformer has a malfunction.

It should be noted that a reforming-fuel injector may have a malfunction as well as the fuel-reformer. However, in the fuel-property reforming apparatus shown in JP-2007-113420A, a malfunction of the reforming-fuel injector can not be detected.

SUMMARY

It is an object of the present disclosure to provide a diagnostic apparatus for a fuel-property reforming system, which is able to detect a malfunction of a reforming-fuel injector.

According to a present disclosure, a diagnostic apparatus for a fuel-property reforming system includes: a reforming-fuel injector for injecting a reforming-fuel into a medium fluid which will be supplied to an intake pipe of the internal combustion engine; a fuel reforming portion for reforming the fuel in the medium fluid; an air-fuel-ratio detecting portion for detecting an air-fuel ratio of an exhaust gas emitted from the internal combustion engine; and a diagnosis portion for diagnosing whether the reforming-fuel injector has a malfunction based on the air-fuel ratio detected by the air-fuel-ratio detecting portion.

According to another aspect of the present disclosure, a diagnostic apparatus for a fuel-property reforming system includes: a reforming-fuel injection apparatus including a reforming-fuel injector for injecting a reforming-fuel into a medium fluid which will be supplied to an intake pipe of the internal combustion engine; a fuel reforming portion for reforming the fuel in the medium fluid; a temperature detecting portion for detecting a temperature of the reforming-fuel injection apparatus; and a diagnosis portion for diagnosing whether the reforming-fuel injection apparatus has a malfunction based on the detected temperature of the reforming-fuel injection apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

[First Embodiment]

Figure 1:
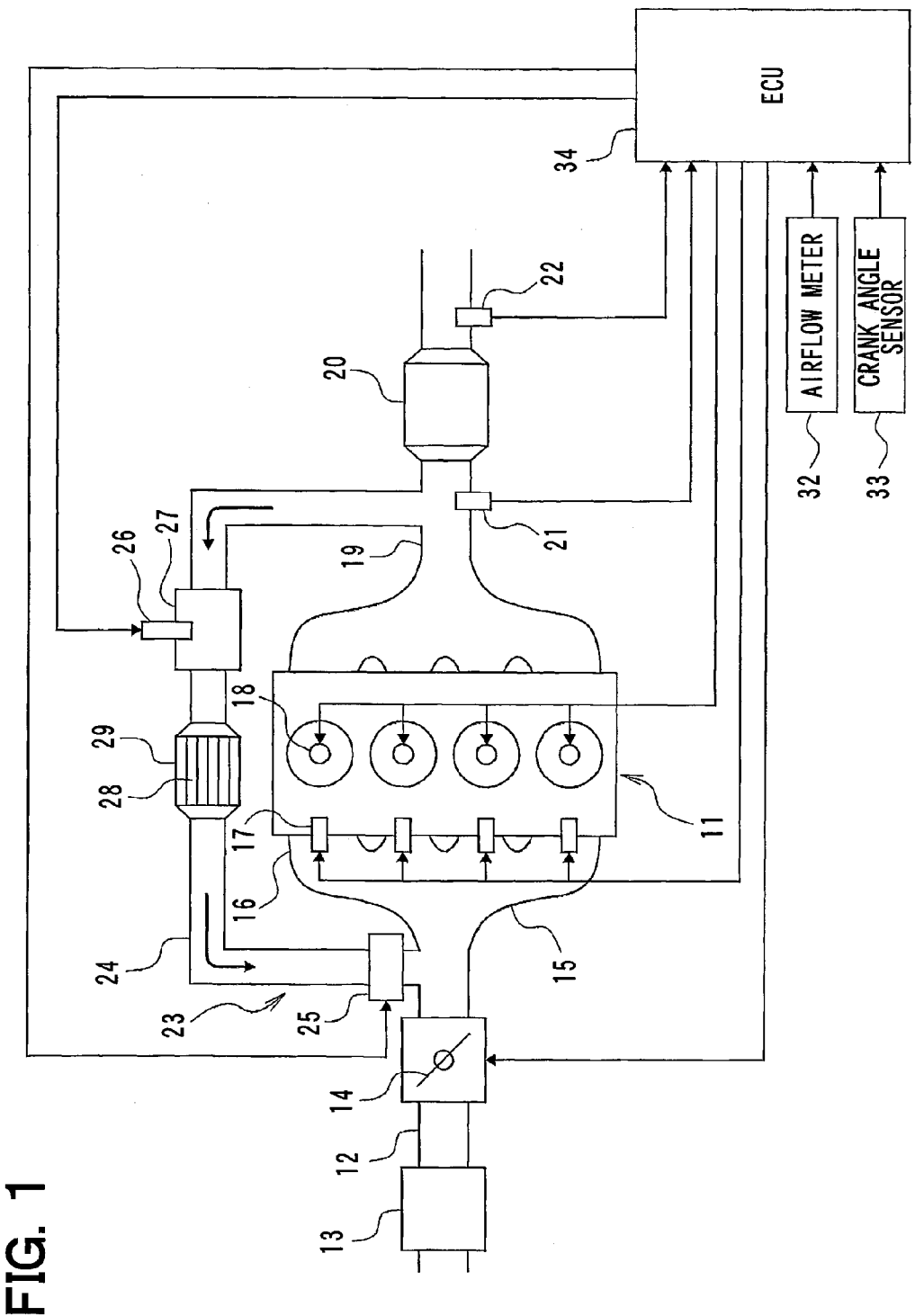
FIG. 1 is a schematic view of an engine control system according to a first embodiment of the present invention.
Figure 2:
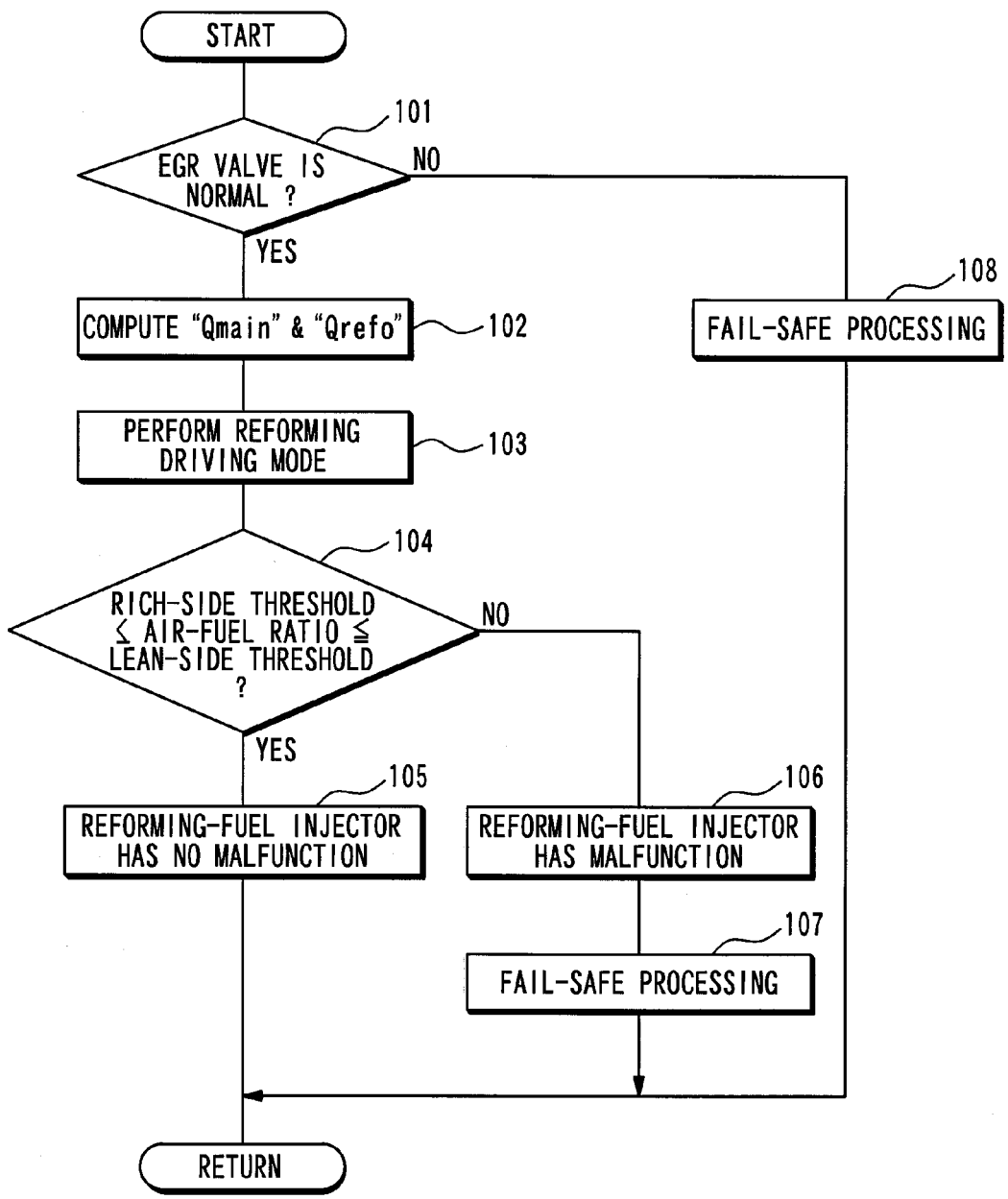
FIG. 2 is a flow chart showing a processing of a diagnosis routine according to the first embodiment.
Figure 3:
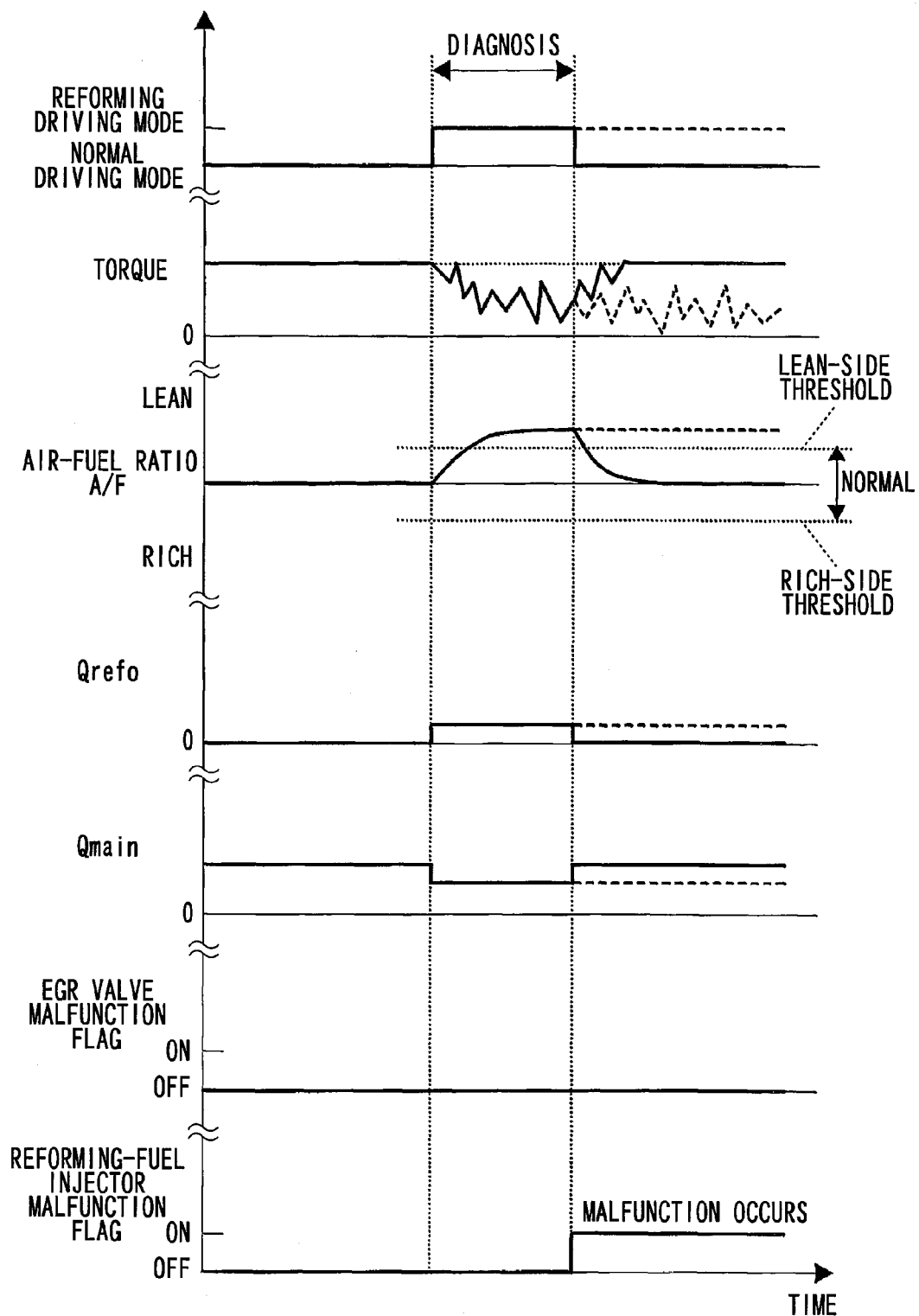
FIG. 3 is a time chart for explaining a diagnosis method according to the first embodiment.

Referring to FIGS. 1 to 3, a first embodiment will be described hereinafter.

First, referring to FIG. 1, an engine control system is explained. An air cleaner 13 is arranged upstream of an intake pipe 12 of an internal combustion engine 11. A throttle valve 14 is arranged downstream of the air cleaner 13. An opening degree of the throttle valve 14 is adjusted by a motor (not shown).

A surge tank 15 is provided downstream of the throttle valve 14. An intake manifold 16 introducing air into each cylinder of the engine 11 is provided downstream of the surge tank 15, and the fuel injector 17 injecting the fuel is provided at a vicinity of an intake port (not shown) connected to the intake manifold 20 of each cylinder. A spark plug 18 is mounted on a cylinder head of the engine 11 corresponding to each cylinder to ignite air-fuel mixture in each cylinder.

An exhaust pipe 19 of the engine 11 is provided with a three-way catalyst 20 purifying CO, HC, and NOx in the exhaust gas. An air-fuel ratio sensor 21 detecting an air-fuel ratio of exhaust gas is provided upstream of the catalyst 20. An exhaust gas sensors 22, such as an oxygen sensor, is disposed upstream of the three-way catalyst 20 to detect rich/lean of the exhaust gas.

The engine 11 is provided with an exhaust gas recirculation (EGR) apparatus 23 for recirculating a part of exhaust gas into the intake pipe 12. The EGR apparatus 23 has an EGR pipe (EGR passage) 24 connecting the exhaust pipe 19 upstream of the catalyst 20 and the intake pipe 12 downstream of the throttle valve 14. An EGR valve 25 is provided in the EGR pipe 24 to adjust an exhaust gas recirculation quantity (external EGR quantity).

The EGR pipe 24 has a reforming-fuel injection apparatus 27 which is provided with a reforming-fuel injector 26 injecting reforming-fuel into the EGR gas. Further, the EGR pipe 24 has a fuel-property reforming apparatus 29 which is provided with a fuel-reforming catalyst 28. The reforming-fuel injection apparatus 27 has a cooling passage through which coolant flows for cooling the reforming-fuel injector 26 and the like. The fuel injector 17 and the reforming-fuel injector 26 receive the fuel from a common fuel tank (not shown).

An airflow meter 32 detecting intake air flow rate and a crank angle sensor 33 are disposed at outer circumference of a crank shaft (not shown) to output a pulse signal every when the crank shaft rotates a specified crank angle. Based on the output signal of the crank angle sensor 33, a crank angle and an engine speed are detected.

The outputs of the above sensors are transmitted to an electronic control unit (ECU) 34. The ECU 34 includes a microcomputer which executes an engine control program stored in a Read Only Memory (ROM) to control a fuel injection quantity, an ignition timing, a throttle position (intake air flow rate) and the like.

When the driving condition of the engine 11 is a specified reforming-condition, for example, when the engine speed is low and the engine load is low, the ECU 34 switches an engine driving mode from a normal driving mode to a reforming driving mode. In the reforming driving mode, while the EGR valve 25 is opened to recirculate a part of exhaust gas into the intake pipe 12, the reforming-fuel injector 26 injects the reforming fuel into the EGR pipe 24. The injected reforming fuel is vaporized, whereby combustibility of the fuel in the EGR gas improved by the fuel-reforming catalyst 28. For example, hydrogen concentration of the EGR gas becomes higher. This reformed fuel is supplied to the intake pipe 12 of the engine 11.

Moreover, the ECU 34 executes a diagnosis routine shown in FIG. 2, whereby it is determined whether the air-fuel ratio detected by the sensor 21 is within a specified normal range. If the detected air-fuel ratio is out of the normal range, the computer determines that the reforming-fuel injector 26 has a malfunction. In a case that the fuel injection quantity is increased or decreased due to a malfunction of the reforming-fuel injector 26, the air-fuel ratio deviates in rich direction or lean direction from the normal range. Thus, if the air-fuel ratio becomes out of the normal range while the reforming-fuel injector 26 injects the reforming-fuel, the computer can determines that the reforming-fuel injector 26 has a malfunction.

Referring to FIG. 2, a processing of the diagnosis routine will be described hereinafter.

The diagnosis routine shown in FIG. 2 is executed at a specified cycle while the ECU 34 is ON. This diagnosis routine corresponds to a diagnosis portion. In step 101, the computer determines whether the EGR valve 25 is normal. When the EGR valve 25 has a malfunction (answer is NO), the procedure proceeds to step 108 in which a fail-safe processing is performed to prohibit the fuel-reforming control.

When the EGR valve 25 has no malfunction (answer is YES), the procedure proceeds to step 102 in which the computer computes a main fuel injection quantity "Qmain" and a reforming-fuel injection quantity "Qrefo" based on a current engine driving condition (engine speed NE and engine load NL). When the fuel-reforming control is executed, the fuel injector 17 injects the fuel of "Qmain" and the reforming-fuel injector 26 injects the reforming-fuel of "Qrefo". Then, the procedure proceeds to step 103 in which the engine driving mode is switched into the reforming driving mode. In the reforming driving mode, while the EGR valve 25 is opened to recirculate a part of exhaust gas into the intake pipe 12, the EGR valve 25 is opened to recirculate a part of the exhaust gas into an intake pipe 12. Then, the reforming-fuel injector 26 injects the reforming-fuel into the exhaust gas flowing through the EGR pipe 24. The injected reforming-fuel is vaporized and flows into the fuel-reforming catalyst 28. The fuel-reforming catalyst 28 reforms the fuel in the exhaust gas into the fuel having high combustibility. The reformed fuel is supplied to the intake pipe 12.

Then, the procedure proceeds to step 104 in which the air-fuel ratio detected by the sensor 21 is within the normal range. That is, it is determined that "Rich-side threshold≤Air-Fuel ratio≤Lean-side threshold". When the answer is YES in step 104, the procedure proceeds to step 105 in which the computer determines that the reforming-fuel injector 26 has no malfunction.

When the answer is NO in step 104, the procedure proceeds to step 106 in which the computer determines that the reforming-fuel injector 26 has a malfunction. Then, the procedure proceeds to step 107 in which the fail-safe processing is conducted. In this fail-safe processing, the reforming-fuel injector 26 is prohibited to inject the reforming-fuel, and the engine driving mode is switched into the normal driving mode. The opening degree of the EGR valve 25 is decreased so that the EGR gas quantity is reduced, or the EGR valve 25 is close so that the EGR gas quantity is made zero. The above processing in step 107 corresponds to a fail-safe portion.

Referring to a time chart shown in FIG. 3, a diagnosis processing according to the first embodiment will be described hereinafter. When the engine driving mode is changed from the normal driving mode to a reforming driving mode, the EGR valve 25 is opened to recirculate a part of the exhaust gas into an intake pipe 12. Then, the reforming-fuel injector 26 injects the reforming-fuel into the exhaust gas flowing through the EGR pipe 24. The injected reforming-fuel is vaporized and flows into the fuel-reforming catalyst 28. The fuel-reforming catalyst 28 reforms the fuel in the exhaust gas into the fuel having high combustibility. The reformed fuel is supplied to the intake pipe 12.

According to the first embodiment, in the reforming driving mode, the computer determines whether the air-fuel ratio within the normal range. Based on this result, the computer determines whether the reforming-fuel injector 26 has a malfunction with high accuracy.

In a system having no diagnosis function, as shown by dashed lines in FIG. 3, even if the reforming-fuel injector 26 has a malfunction, this malfunction can not be detected and no fail-safe processing can be conducted. Thus, it is likely that a combustion condition of the engine 11 is deteriorated and variation in torque occurs, which may deteriorate drivability.

Meanwhile, according to the first embodiment, in the reforming driving mode, the computer determines whether the air-fuel ratio within the normal range. Based on this result, the computer determines whether the reforming-fuel injector 26 has a malfunction. If it is determined that the air-fuel ratio is out of the normal range, the commuter determines that reforming-fuel injector 26 has a malfunction and executes the fail-safe processing to prohibit the reforming-fuel injector 26 from injecting the reforming-fuel. Thus, it is restricted that the air-fuel ratio deviates due to a malfunction of the reforming-fuel injector 26. Further, it is restricted that the drivability is deteriorated and the emission is deteriorated.

[Second Embodiment]

Figure 4:
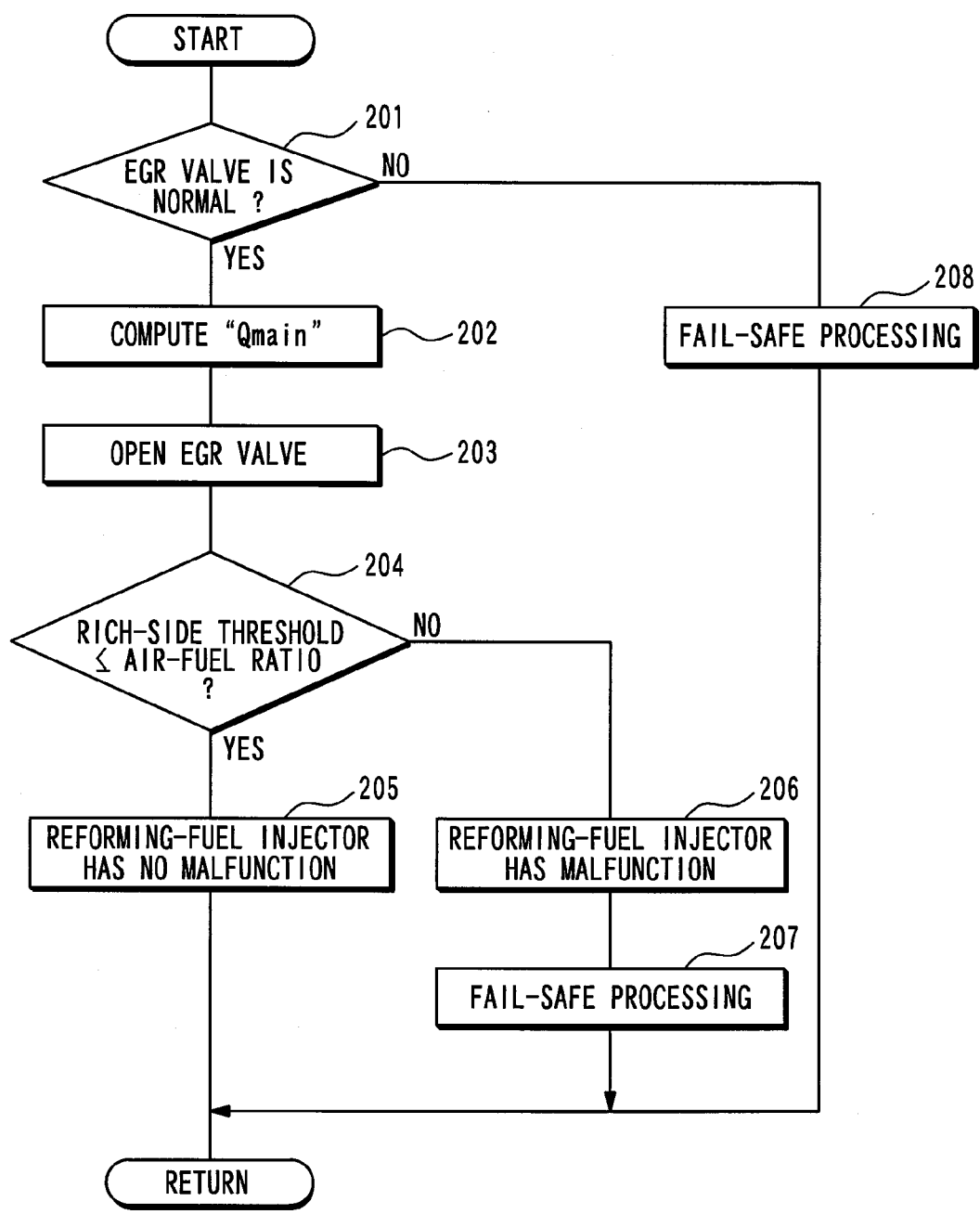
FIG. 4 is a flow chart showing a processing of a diagnosis routine according to a second embodiment.
Figure 5:
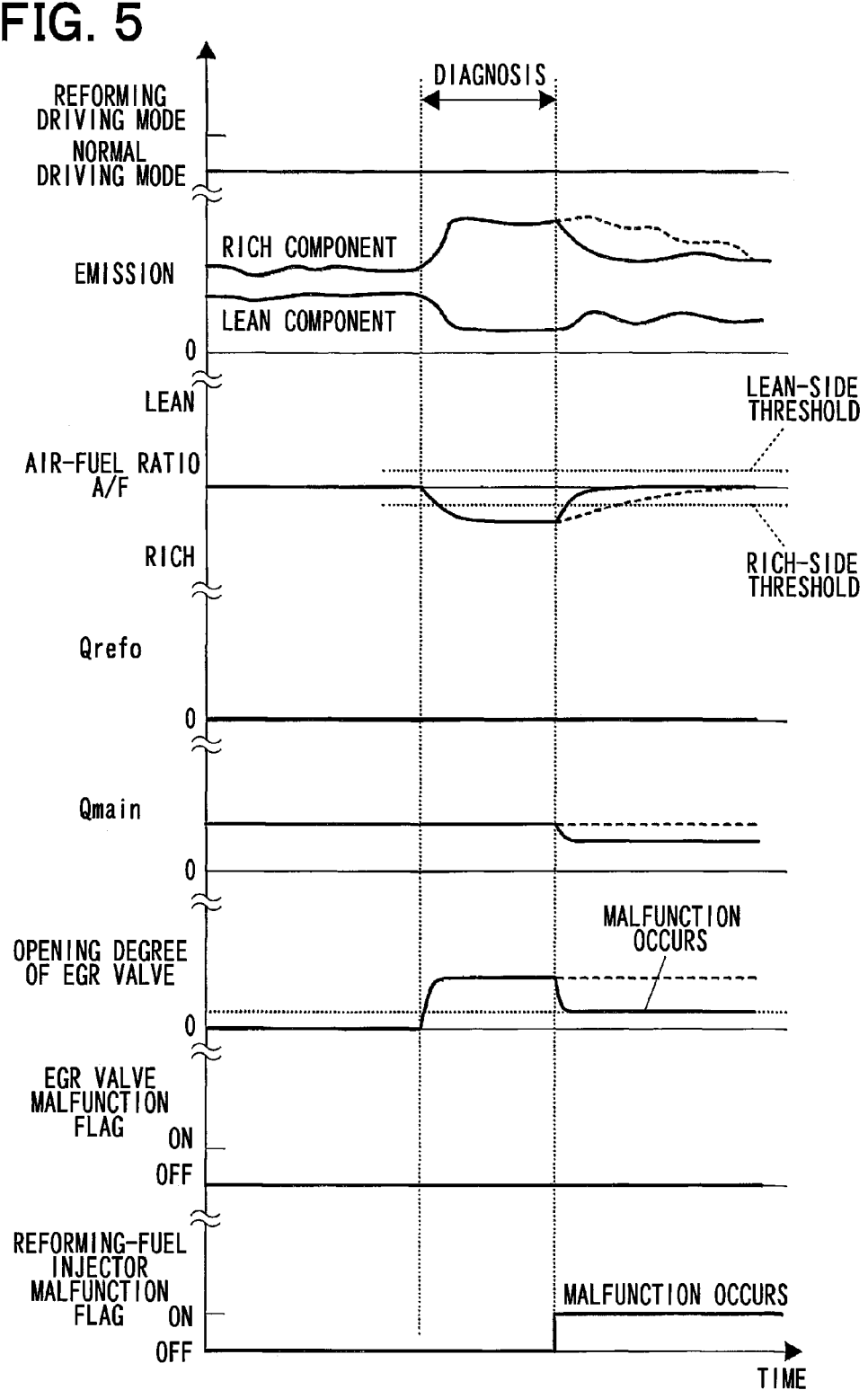
FIG. 5 is a time chart for explaining a diagnosis method according to the second embodiment.

Referring to FIGS. 4 and 5, a second embodiment will be described hereinafter. In the second embodiment, the same parts and components as those in the first embodiment are indicated with the same reference numerals and the same descriptions will not be reiterated.

The ECU 34 executes a diagnosis routine shown in FIG. 4. In the normal driving mode, while the EGR gas is introduced into the EGR pipe 24, the air-fuel ratio detected by the sensor 21 is compared with a rich-side threshold. When the air-fuel ratio becomes richer than the rich-side threshold, the computer determines that the reforming-fuel injector 26 has a malfunction, such as fuel leak. If a fuel leak occurs due to a malfunction of the reforming-fuel injector 26 while no fuel injection is conducted, the air-fuel ratio deviates in a rich direction. Thus, if the air-fuel ratio becomes richer than the rich-side threshold while the reforming-fuel injector 26 injects no reforming-fuel, the computer can determines that the reforming-fuel injector 26 has a malfunction (fuel leak).

Referring to FIG. 4, a processing of the diagnosis routine according to the second embodiment will be described hereinafter.

This diagnosis routine is executed at specified intervals while the ECU 34 is ON. In step 201, the computer determines whether the EGR valve 25 is normal. When the EGR valve 25 has a malfunction (answer is NO), the procedure proceeds to step 208 in which a fail-safe processing is performed to prohibit the fuel-reforming control.

When the EGR valve 25 has no malfunction (answer is YES), the procedure proceeds to step 202 in which the computer computes a main fuel injection quantity "Qmain" for a case that EGR gas is introduced into the EGR pipe 24, based on a current engine driving condition (engine speed NE and engine load NL). The fuel injector 17 injects the fuel of "Qmain" in the normal driving mode. In this case, the reforming-fuel quantity "Qrefo" is set to zero. Then, the procedure proceeds to step 203 in which the EGR valve 25 is opened to recirculate a part of exhaust gas into the intake pipe 12, Then, the procedure proceeds to step 204 in which the computer determines whether the air-fuel ratio detected by the sensor 21 is leaner than the rich-side threshold. When the answer is YES in step 204, that is, when the air-fuel ratio is leaner than the rich-side threshold, the procedure proceeds to step 205 in which the computer determines that the reforming-fuel injector 26 has no malfunction.

When the answer is NO in step 204, that is, when the air-fuel ratio is richer than the rich-side threshold, the procedure proceeds to step 206 in which the computer determines that the reforming-fuel injector 26 has a malfunction (fuel leak). Then, the procedure proceeds to step 207 in which the fail-safe processing is performed. In this fail-safe processing, the opening degree of the EGR valve 25 is decreased so that the EGR gas quantity is reduced, and the fuel injection quantity by the fuel injector 17 is corrected to be decreased.

Referring to a time chart shown in FIG. 5, a diagnosis processing according to the second embodiment will be described hereinafter.

In the normal driving mode, while the EGR gas is introduced into the EGR pipe 24, the air-fuel ratio detected by the sensor 21 is compared with a rich-side threshold, whereby it is determined whether the reforming-fuel injector 26 has a malfunction (fuel leak) with high accuracy.

In a system having no diagnosis function, as shown by dashed lines in FIG. 5, even if the reforming-fuel injector 26 has a malfunction, this malfunction can not be detected and no fail-safe processing can be conducted. Thus, it is likely that a combustion condition of the engine 11 is deteriorated and variation in torque occurs, which may deteriorate drivability.

Meanwhile, according to the second embodiment, in the normal driving mode, while the EGR gas is introduced into the EGR pipe 24, the air-fuel ratio detected by the sensor 21 is compared with the rich-side threshold. When the detected air-fuel ratio becomes richer than the rich-side threshold, it is determined that the reforming-fuel injector 26 has a malfunction (fuel leak). The opening degree of the EGR valve 26 is decreased, the EGR gas quantity is also reduced, and the fail-safe processing is performed to prohibit the fuel injector 17 from injecting the fuel. Thus, the fuel leaked from the fuel injector 26 is returned into the intake pipe 12 with the EGR gas, whereby the deviation in air-fuel ratio is decreased. The leaked fuel is not accumulated in the EGR pipe 24.

[Third Embodiment]

Figure 6:
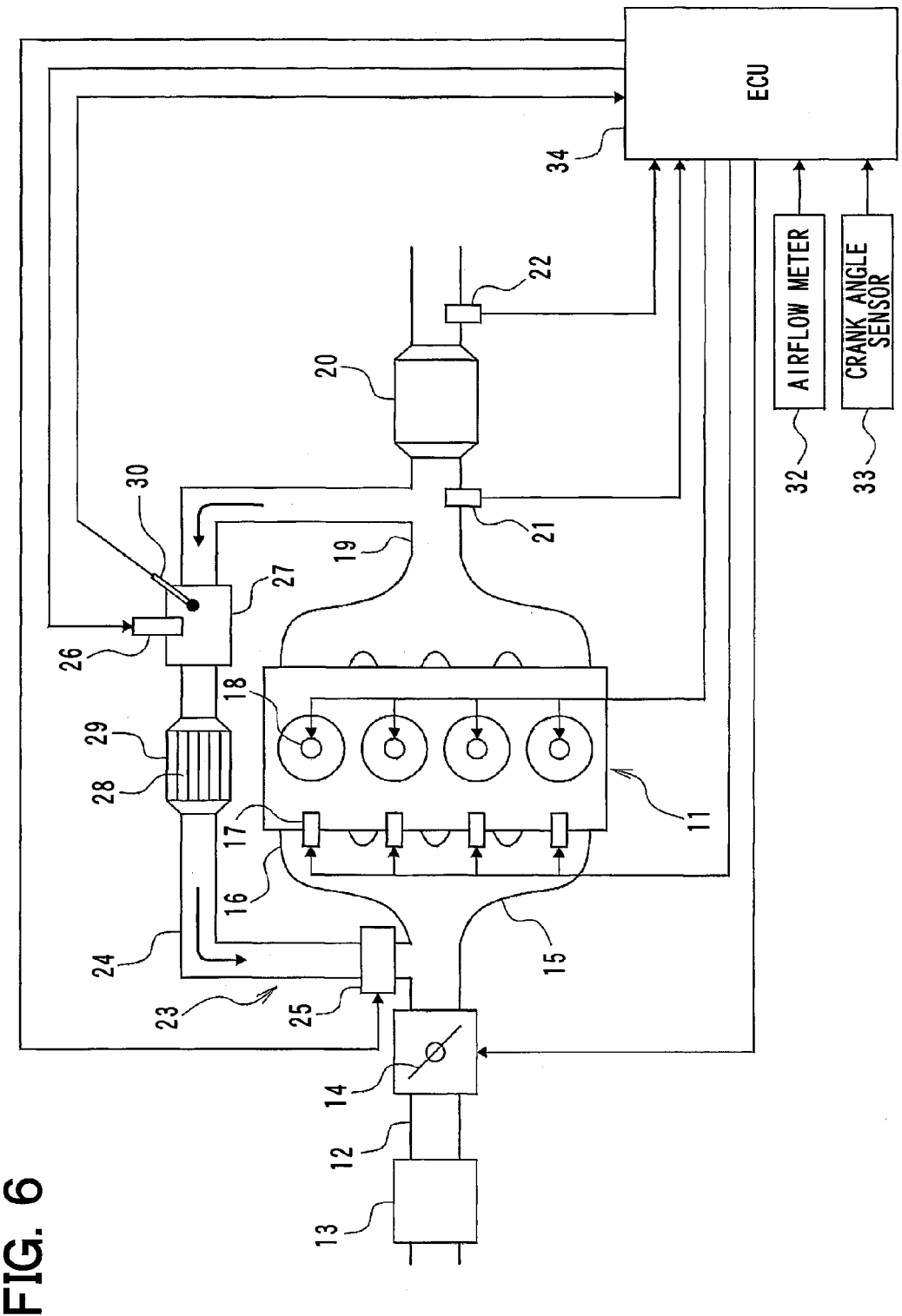
FIG. 6 is a schematic view of an engine control system according to a third embodiment of the present invention.
Figure 7:
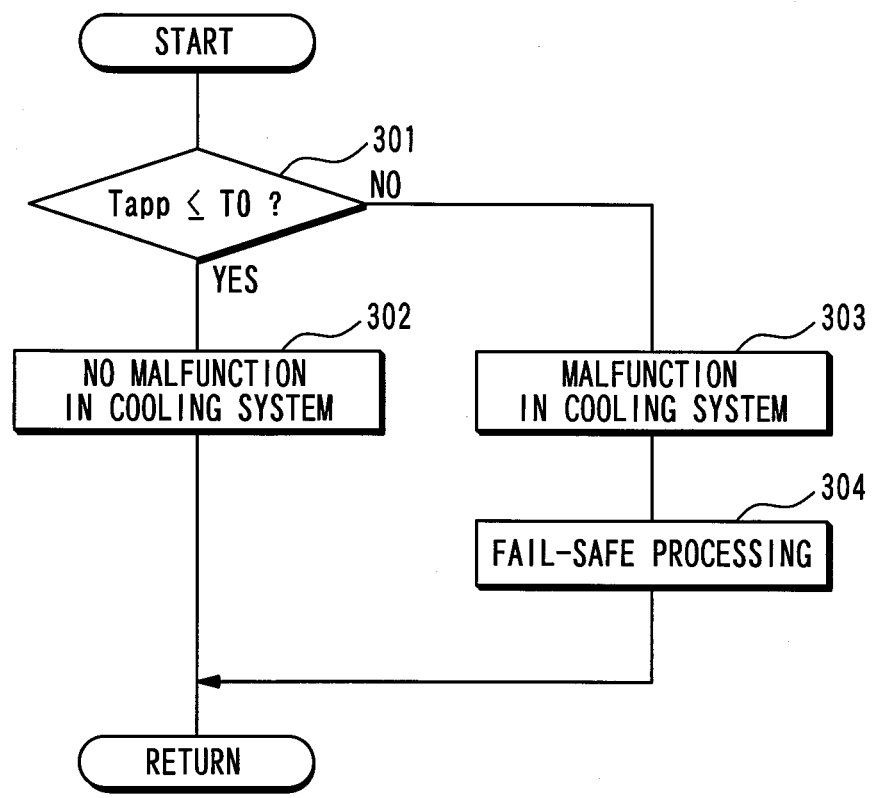
FIG. 7 is a flow chart showing a processing of a diagnosis routine according to the third embodiment.
Figure 8:
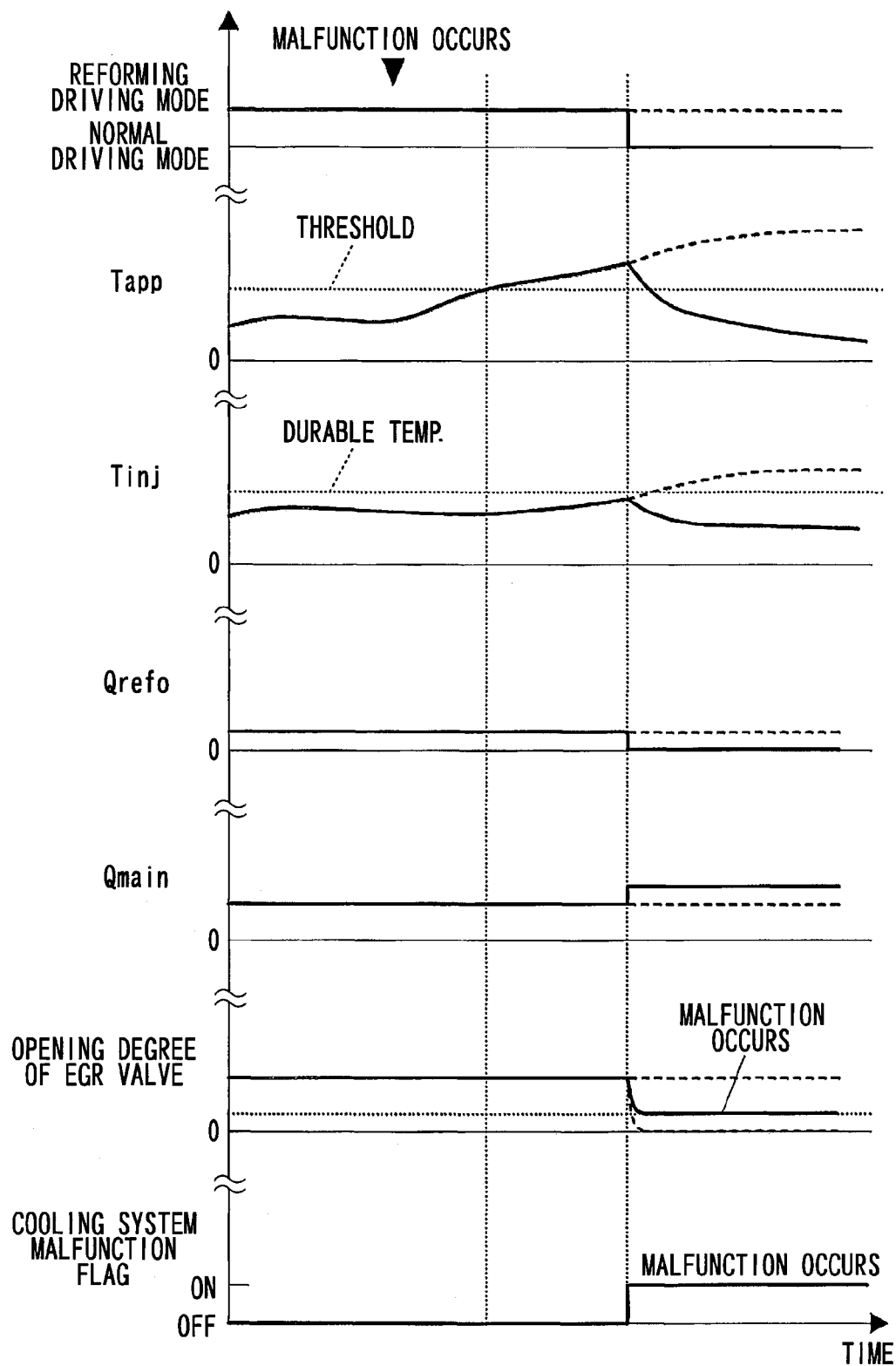
FIG. 8 is a time chart for explaining a diagnosis method according to the third embodiment.

Referring to FIGS. 6 to 8, a third embodiment will be described hereinafter. In the third embodiment, the same parts and components as those in the first and the second embodiment are indicated with the same reference numerals and the same descriptions will not be reiterated.

In the third embodiment, as shown in FIG. 6, the system is provided with a temperature sensor 30 which detects a temperature of the reforming-fuel injection apparatus 27. The other configuration of the system is the same as the first embodiment shown in FIG. 1.

The ECU 34 executes a diagnosis routine shown in FIG. 7. The detected temperature of the reforming-fuel injection apparatus 27 is compared with a specified determination value. When the detected temperature exceeds the specified determination value, it is determined that the reforming-fuel injection apparatus 27 has a malfunction in its cooling system. If the cooling system has a malfunction, the temperature of the reforming-fuel injection apparatus 27 is increased.

Referring to FIG. 7, a processing of the diagnosis routine according to the third embodiment will be described hereinafter.

This diagnosis routine is executed at specified intervals while the ECU 34 is ON. In step 301, the computer determines whether the temperature "Tapp" of the reforming-fuel injection apparatus 27 is less than or equal to a specified determination value "T0". The determination value "T0" is set lower than a durable temperature of the reforming-fuel injection apparatus 27.

When the answer is YES in step 301, that is, when the "Tapp" is less than or equal to "T0", the procedure proceeds to step 302 in which the computer determines that the reforming-fuel injection apparatus 27 has no malfunction in its cooling system.

When the answer is NO in step 301, the procedure proceeds to step 303 in which the computer determines that the reforming-fuel injection apparatus 27 has a malfunction in its cooling system. Then, the procedure proceeds to step 304 in which a fail-safe processing is conducted. In this fail-safe processing, the reforming-fuel injector 26 is prohibited from injecting the reforming-fuel and the engine driving mode is switched into the normal driving mode. Further, the opening degree of the EGR valve 25 is restricted so that the EGR gas quantity is reduced or made zero.

Referring to a time chart shown in FIG. 8, a diagnosis processing according to the third embodiment will be described hereinafter. The detected temperature "Tapp" of the reforming-fuel injection apparatus 27 is compared with the specified determination value "T0". When the detected temperature "Tapp" exceeds the specified determination value "T0", it is determined that the reforming-fuel injection apparatus 27 has a malfunction in its cooling system.

In a system having no diagnosis function of cooling system, as shown by dashed lines in FIG. 8, even if the reforming-fuel injection apparatus 27 has a malfunction in its cooling system, this malfunction can not be detected and no fail-safe processing can be conducted. Thus, it is likely that the reforming-fuel injection apparatus 27 and the reforming-fuel injector 26 may be over-heated.

Meanwhile, according to the third embodiment, the detected temperature "Tapp" of the reforming-fuel injection apparatus 27 is compared with the specified determination value "T0". When the detected temperature "Tapp" exceeds the specified determination value "T0", it is determined that the reforming-fuel injection apparatus 27 has a malfunction in its cooling system. The reforming-fuel injector 26 is prohibited from injecting the reforming-fuel, and the opening degree of the EGR valve 25 is restricted so that the EGR gas quantity is reduced or made zero.

Thus, it can be avoided that the reforming-fuel injection apparatus 27 and the reforming-fuel injector 26 are overheated. Moreover, the EGR gas quantity is reduced or made zero, so that it can be avoided that the reforming-fuel injection apparatus 27 and the reforming-fuel injector 26 are overheated.

[Fourth Embodiment]

Figure 9:
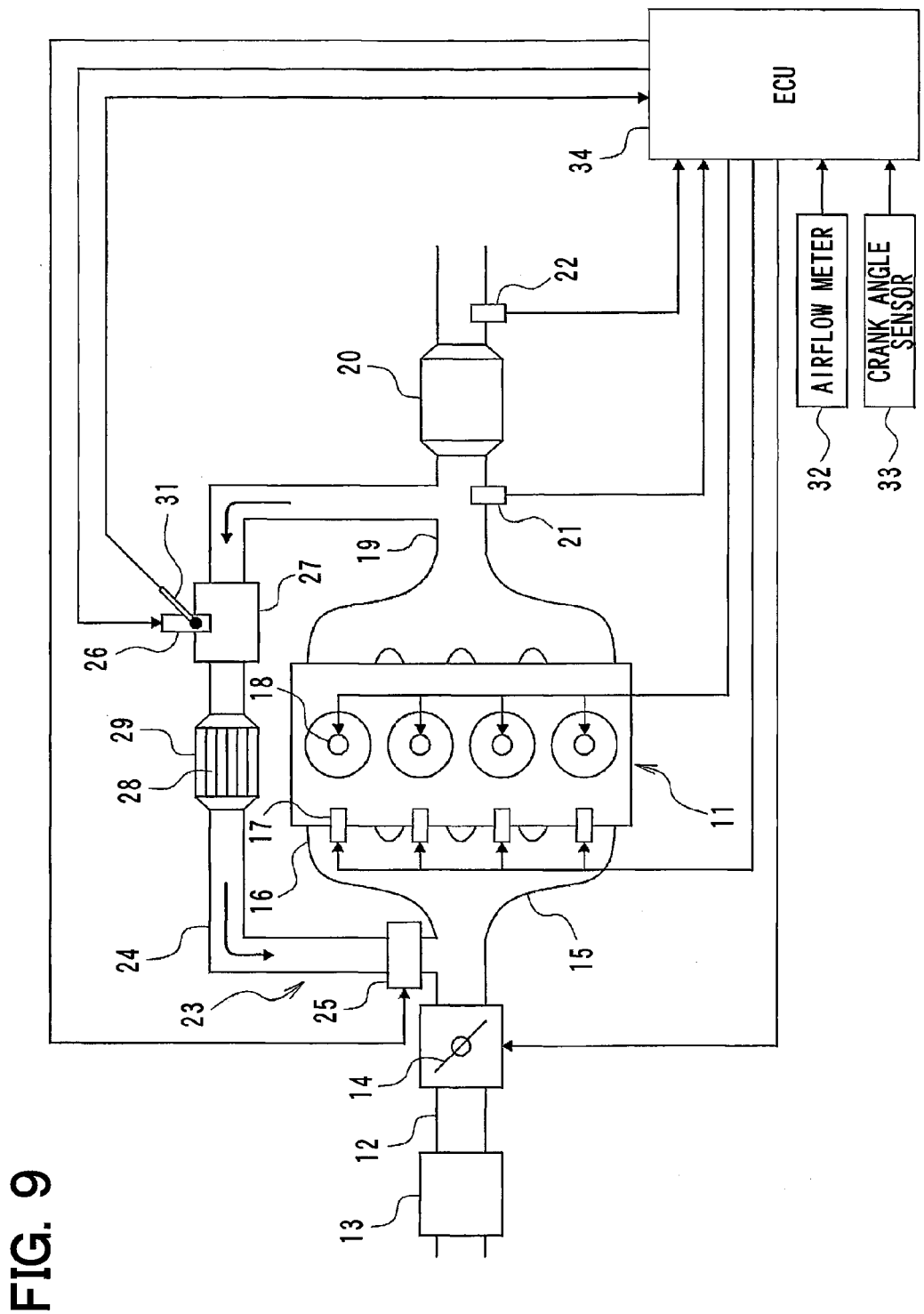
FIG. 9 is a schematic view of an engine control system according to a fourth embodiment of the present invention.
Figure 10:
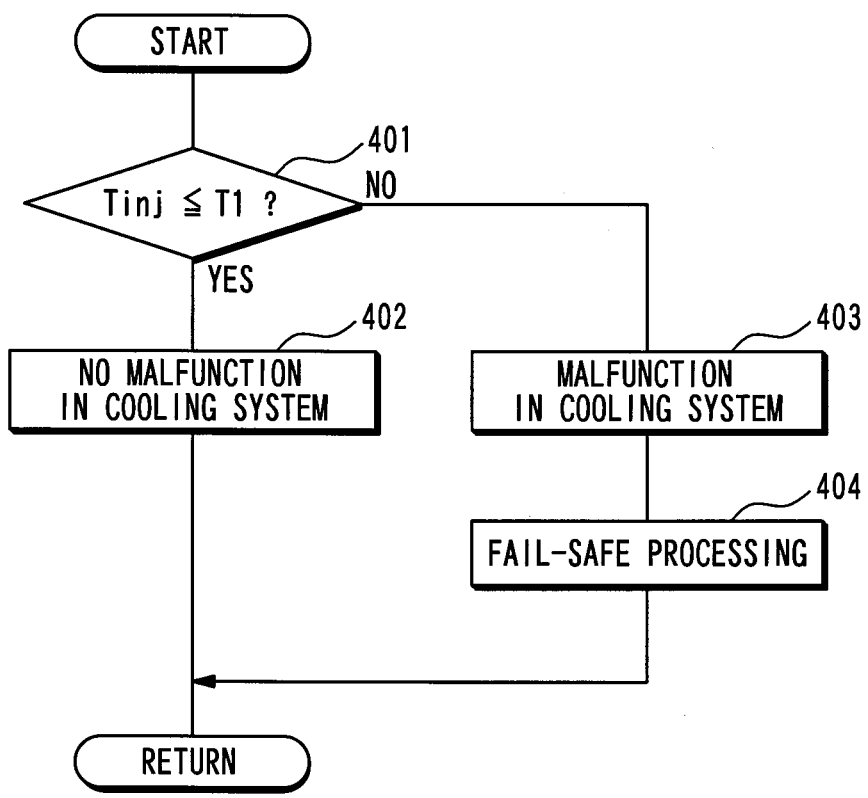
FIG. 10 is a flow chart showing a processing of a diagnosis routine according to the fourth embodiment.
Figure 11:
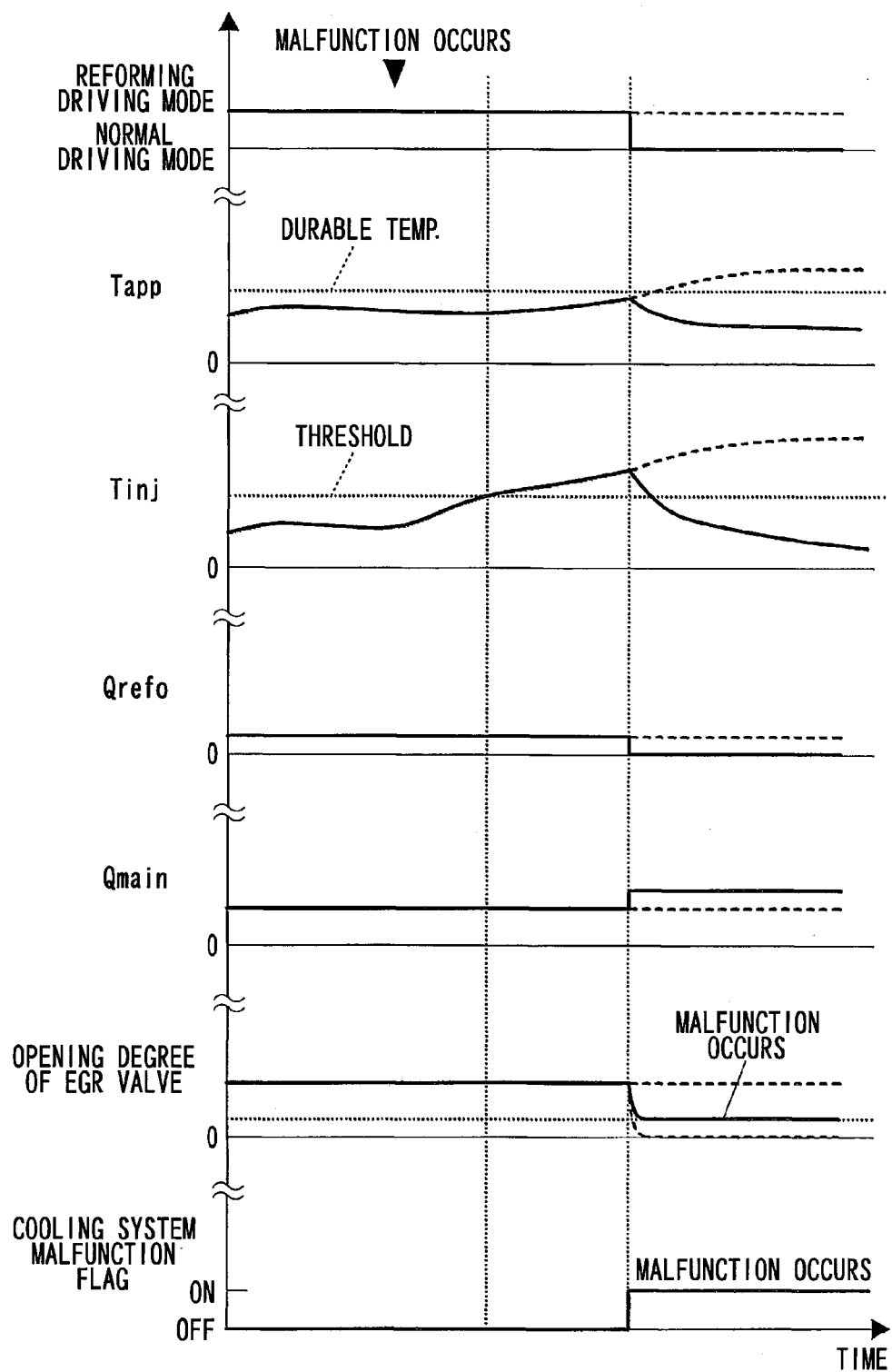
FIG. 11 is a time chart for explaining a diagnosis method according to the fourth embodiment.

Referring to FIGS. 9 to 11, a fourth embodiment will be described hereinafter. In the fourth embodiment, the same parts and components as those in the first to the third embodiment are indicated with the same reference numerals and the same descriptions will not be reiterated.

In the fourth embodiment, as shown in FIG. 9, the system is provided with a temperature sensor 31 which detects a temperature of the reforming-fuel injector 26. The other configuration of the system is the same as the first embodiment shown in FIG. 1.

The ECU 34 executes a diagnosis routine shown in FIG. 10. The detected temperature of the reforming-fuel injector 26 is compared with a specified determination value. When the detected temperature exceeds the specified determination value, it is determined that the reforming-fuel injector 26 has a malfunction in its cooling system. If the cooling system has a malfunction, the temperature of the reforming-fuel injector 26 is increased.

Referring to FIG. 10, a processing of the diagnosis routine according to the fourth embodiment will be described hereinafter. This diagnosis routine is executed at specified intervals while the ECU 34 is ON. In step 401, the computer determines whether the temperature "Tinj" of the reforming-fuel injector 26 is less than or equal to a specified determination value "T1". The determination value "T1" is set lower than a durable temperature of the reforming-fuel injector 26.

When the answer is YES in step 401, that is, when the "Tinj" is less than or equal to "T1", the procedure proceeds to step 402 in which the computer determines that the reforming-fuel injector 26 has no malfunction in its cooling system.

When the answer is NO in step 401, the procedure proceeds to step 403 in which the computer determines that the reforming-fuel injector 26 has a malfunction in its cooling system. Then, the procedure proceeds to step 404 in which a fail-safe processing is conducted. In this fail-safe processing, the reforming-fuel injector 26 is prohibited from injecting the reforming-fuel and the engine driving mode is switched into the normal driving mode. Further, the opening degree of the EGR valve 25 is restricted so that the EGR gas quantity is reduced or made zero.

Referring to a time chart shown in FIG. 11, a diagnosis processing according to the fourth embodiment will be described hereinafter. The detected temperature "Tinj" of the reforming-fuel injector 26 is compared with the specified determination value "T1". When the detected temperature "Tinj" exceeds the specified determination value "T1", it is determined that the reforming-fuel injector 26 has a malfunction in its cooling system.

In a system having no diagnosis function of cooling system, as shown by dashed lines in FIG. 11, even if the reforming-fuel injector 26 has a malfunction in its cooling system, this malfunction can not be detected and no fail-safe processing can be conducted. Thus, it is likely that the reforming-fuel injection apparatus 27 and the reforming-fuel injector 26 may be over-heated.

Meanwhile, according to the fourth embodiment, the detected temperature "Tinj" of the reforming-fuel injector 26 is compared with the specified determination value "T1". When the detected temperature "Tinj" exceeds the specified determination value "T1", it is determined that the reforming-fuel injector 26 has a malfunction in its cooling system. The reforming-fuel injector 26 is prohibited from injecting the reforming-fuel, and the opening degree of the EGR valve 25 is restricted so that the EGR gas quantity is reduced or made zero. The substantially same advantage as the third embodiment can be obtained.

In the above embodiments, the reforming-fuel injection apparatus 27 and the fuel-reformer are disposed in the EGR pipe. However, the EGR pipe may be provided with only the reforming-fuel injection apparatus 27. The fuel-reformer is not always necessary. In this case, the reforming-fuel is injected into high-temperature EGR gas, so that the fuel is reformed in the EGR pipe. The EGR system functions as the fuel reforming apparatus.

The reforming-fuel injection apparatus 27 and the fuel-reformer may be arranged downstream of a supercharger in the intake pipe. Alternatively, only reforming-fuel injection apparatus 27 may be arranged downstream of the supercharger in the intake pipe. In this case, the reforming-fuel is injected into high-pressure intake air boosted by the supercharger to reform the fuel. The supercharger functions as the fuel reforming apparatus.

The present invention is not limited to an intake port injection engine. The present invention can be applied to a direct injection engine or a dual injection engine.

What is claimed is:

1. A diagnostic apparatus for a fuel-property reforming system provided in an internal combustion engine, comprising:
    a reforming-fuel injector for injecting a reforming-fuel into a medium fluid which will be supplied to an intake pipe of the internal combustion engine;
    a fuel reforming portion for reforming the fuel in the medium fluid;
    an air-fuel-ratio detecting portion for detecting an air-fuel ratio of an exhaust gas emitted from the internal combustion engine; and
    a diagnosis portion for diagnosing whether the reforming-fuel injector has a malfunction based on the air-fuel ratio detected by the air-fuel-ratio detecting portion.

2. A diagnostic apparatus for a fuel-property reforming system according to claim 1, wherein:
    the diagnosis portion determines that the reforming-fuel injector has a malfunction when the detected air-fuel ratio becomes out of a specified normal range while the reforming-fuel injector injects the reforming fuel.

3. A diagnostic apparatus for a fuel-property reforming system according to claim 2, further comprising:
    a fail-safe processing portion for prohibiting the reforming-fuel injector from injecting the reforming-fuel when the diagnosis portion determines that the reforming-fuel injector has a malfunction.

4. A diagnostic apparatus for a fuel-property reforming system according to claim 1, wherein:

the diagnosis portion determines that the reforming-fuel injector has a malfunction when the detected air-fuel ratio deviates in a rich direction while the reforming-fuel injector injects no reforming fuel.

5. A diagnostic apparatus for a fuel-property reforming system according to claim 4, further comprising:
   an exhaust gas recirculation apparatus which recirculates a part of the exhaust gas into the intake pipe through an EGR passage in which the reforming-fuel injector and the fuel reforming portion are provided; and
   a fail-safe processing portion for reducing a recirculating quantity of the exhaust gas when the diagnosis portion determines that the reforming-fuel injector has a malfunction.

* * * * *